United States Patent
Perlman

(10) Patent No.: US 6,580,722 B1
(45) Date of Patent: Jun. 17, 2003

(54) BYPASSING TOPOLOGICAL RESTRICTIONS WITH TUNNELS

(75) Inventor: Radia J. Perlman, Acton, MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/138,586

(22) Filed: Aug. 21, 1998

(51) Int. Cl.[7] .................................................. H04J 3/26
(52) U.S. Cl. ...................................... 370/432; 370/401
(58) Field of Search ................................ 370/352, 353, 370/355, 389, 390, 401, 432, 356, 392, 469, 475, 466, 465, 351, 312

(56) References Cited

U.S. PATENT DOCUMENTS

| | | | |
|---|---|---|---|
| 5,740,375 A | | 4/1998 | Dunne et al. ............ 395/200.68 |
| 5,831,975 A | * | 11/1998 | Chen et al. .................. 370/390 |
| 6,031,818 A | * | 2/2000 | Lo et al. ...................... 370/390 |
| 6,058,113 A | * | 5/2000 | Chang ........................ 370/390 |
| 6,078,590 A | * | 6/2000 | Farinacci et al. ............ 370/432 |
| 6,137,799 A | * | 10/2000 | Karapetkov et al. ........ 370/395 |
| 6,181,697 B1 | * | 1/2001 | Nurenberg et al. .......... 370/390 |
| 6,259,701 B1 | * | 7/2001 | Shur et al. ................... 370/401 |

FOREIGN PATENT DOCUMENTS

| | | |
|---|---|---|
| WO | 97/48051 | 6/1997 |
| WO | 98/02821 | 7/1997 |

OTHER PUBLICATIONS

*Proxy–based Reliable Multicast Protocol;* Yoojae Won, Kyungshik Lim, Seung–Ku Kwang, Kwan–JongYoo; Department of Multimedia Technology Electronics and Telecommunications Research Institute; Department of Computer Science Chungnam National University.
*Distance Vector Multicast Routing Protocol*, Nov., 1998.
*Distance Vector Multicast Routing Protocol*, Aug., 1998.
*Protocol Independent Multicast–Sparse Mode (PIM–SM) : Protocol Specification*, Jun., 1998.
*Multicast Extensions to OSPF*, Aug., 1998.
*Multicast Extensions to OSPF*, Mar., 1994.

* cited by examiner

*Primary Examiner*—Ajit Patel
(74) *Attorney, Agent, or Firm*—Weingarten, Schurgin, Gagnebin & Lebovici LLP

(57) ABSTRACT

Data units are tunneled through topological restrictions that reside in a path between a first network device and a second network device. For example, a remote network device that resides outside of the domain of a multicast group obtains access to the multicast group by tunneling through the boundary of the domain. A proxy device within the domain functions as a member of the multicast group on behalf of the remote network device. Data units that are transmitted from the remote network device to the proxy device are tunneled to the multicast group via the proxy device. Data units that are transmitted from the multicast group to the proxy device are tunneled to the remote network device via the proxy device.

34 Claims, 4 Drawing Sheets

BYPASSING TOPOLOGICAL RESTRICTIONS WITH TUNNELS

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention is related to communications in a computer network, and particularly to bypassing topological restrictions such as multicast group domains by employing tunnels.

Multicast protocols such as Distance Vector Multicast Routing Protocol ("DVMRP"), Multicast Open Shortest Path First ("MOSPF"), Core Based Trees ("CBT"), and Protocol Independent Multicast ("PIM") that are employed to manage multicast communications among members of a multicast group are known. However, known multicast protocols can consume large amounts of network resources. DVMRP operates by flooding data which consumes network bandwidth. MOSPF requires routers to store records for all of the multicast groups that a device might possibly join. The number of records that must be stored becomes excessive in the case of devices that are connected with an extensive network such as the Internet. CBT and PIM employ a tree which consists of paths between member devices and a core device. The routers that reside along each path are required to maintain records that describe the path. Hence, the number of records that must be maintained is excessive along paths that employ a large number of routers.

Two types of multicast distribution trees are known. In unidirectional trees, which are illustrated in Prior Art FIG. 1, all links in the tree carry all data in only one direction. Therefore, in a unidirectional shared tree a member M other than the core C unicasts a packet to the Core C and then the packet is distributed along the tree. In contrast, in a bidirectional tree, as illustrated in Prior Art FIG. 2, any member M on the tree can inject the packet into the tree by transmitting on all of its ports that are associated with the tree, and any device on the tree that receives the packet on any of its ports that are associated with the tree forwards the packet onto all of its ports that are associated with the tree (except the port on which the packet was received).

It is known to limit the amount of resources that a multicast group consumes by imposing bounds on the group. For example, it is known to prevent the multicast group from extending beyond a predetermined "domain." Resources are conserved because only the routers that reside within the domain are required to maintain information about the group. Further, data is not flooded outside of the domain so that the multicast address of the domain can also be used by other, non-overlapping bounded domains. For example, if the domain boundaries were the countries Sweden and Denmark, there could be a multicast group with address A in Sweden and another multicast group with address A in Denmark. However, one problem associated with a bounded multicast group is that nodes outside the domain cannot join the multicast group. It would therefore be desirable to be able to bypass topological restrictions such as multicast group domains.

BRIEF SUMMARY OF THE INVENTION

In accordance with the present invention, data units are tunneled to avoid topological or domain restrictions between a first network device and a second network device. In the case of a bounded multicast group, a remote network device that resides outside of the domain of the multicast group obtains access to the multicast group via a proxy device that resides within the domain. The proxy device functions as a member of the multicast group on behalf of the remote network device. Data units transmitted from the remote network device to the proxy device are tunneled to the multicast group via the proxy device. Data units transmitted from the multicast group to the proxy device are tunneled to the remote network device via the proxy device.

Use of the tunnel to obtain remote access to a multicast group advantageously permits remote access without compromising the efficiency provided by the bounded domain. Router devices that reside along the tunnel between the proxy and the remote device are not required to maintain state information. Further, single data units can be tunneled to a designated remote router device and then multicast to a group of remote network devices.

Tunnels can also be employed to facilitate communication in multicast groups in which some routers do not support bidirectional trees. Multicast groups can be represented with a tree structure that is stored in routers that reside in communication paths that are employed by members of the multicast group. A single, bidirectional tree requires less memory to store than a plurality of unidirectional trees. However, some network devices do not support establishment of bidirectional trees. Tunnels are employed to bypass the network devices that do not support bidirectional trees. For example, a bidirectional tunnel can be established from a first device that supports bidirectional trees, through a device that does not support bidirectional trees, to a second device that supports bidirectional trees to bypass the device that does not support bidirectional trees.

BRIEF DESCRIPTION OF THE SEVERAL VIEWS OF THE DRAWING

The foregoing features of this invention, as well as the invention itself, may be more fully understood from the following Detailed Description of the Invention, and Drawing, of which.

DETAILED DESCRIPTION OF THE INVENTION

Figure 1:
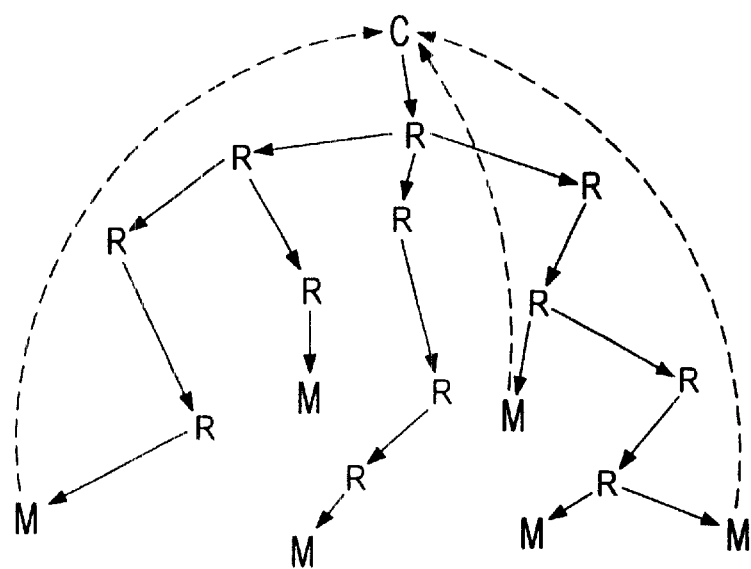
FIG. 1 is a block diagram that illustrates unidirectional trees employed in a manner that is known in the art.
Figure 2:
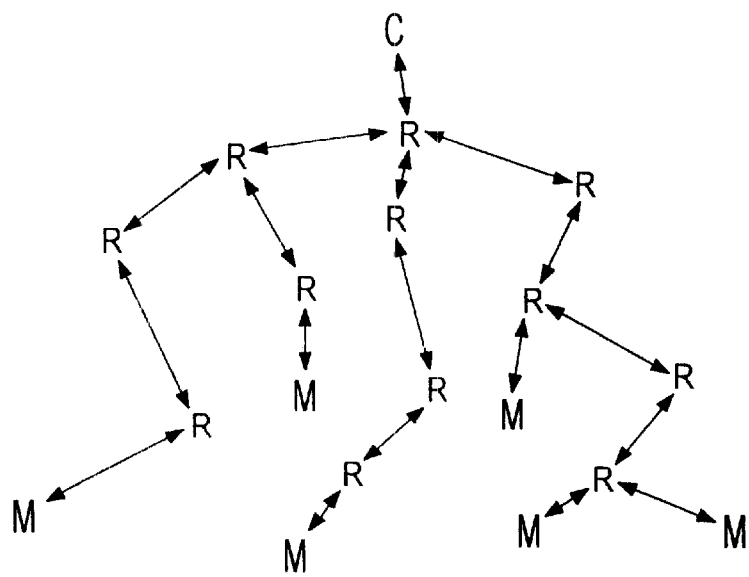
FIG. 2 is a block diagram that illustrates bidirectional trees employed in a manner that is known in the art.
Figure 3:
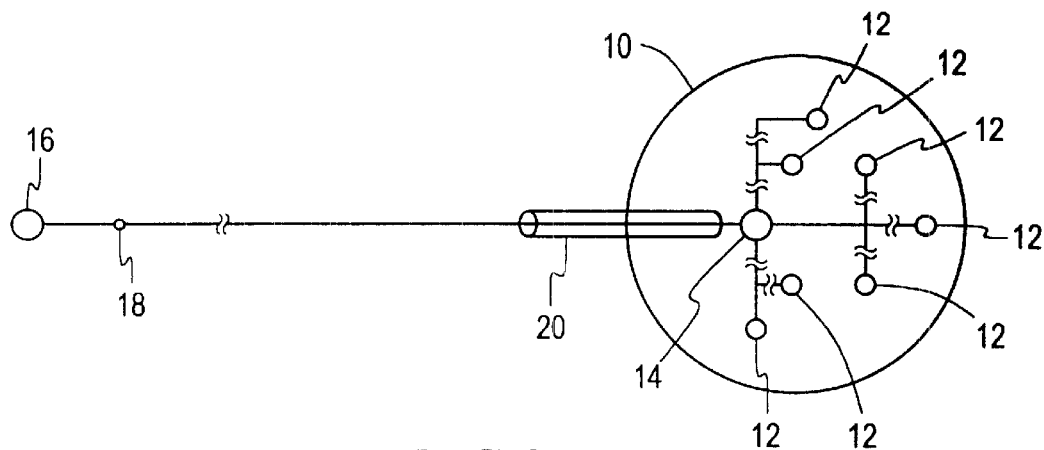
FIG. 3 is a block diagram of a portion of a computer network that illustrates a remote network device that is affiliated with a bounded multicast group in a manner that is consistent with the present invention.

Referring to FIG. 3, an illustrative multicast group includes a plurality of member devices 12 and a core device 14, each of which resides within a predetermined domain 10. Intermediate network devices such as routers may reside in the paths between a core device 14 and the member devices 12. To transmit to the members of the multicast group, an individual member transmits a multicast data unit on all of its ports which are associated with a multicast tree. In the case of a bidirectional tree, each device that receives the multicast data unit transmits the multicast data unit on all of its ports which are associated with the multicast tree, except the port on which the data unit was received. In the case of a unidirectional tree where the member that initiates the data unit is not the core, the member unicasts the data unit to the core, which then multicasts the data unit to the group.

The multicast group is typically bounded by the associated domain 10. The intermediate network devices that reside along the paths between the core device 14 and ones of the members 12 of the multicast group maintain state information that facilitates delivery of the copies of the multicast data unit. The collection of paths between the core device and the intermediate network devices forms a "tree," and the intermediate network devices maintain multicast address information that describes the topology of the tree to facilitate locating the members of the multicast group. The amount of resources that the multicast group consumes with requirements such as the maintenance of state information is limited by imposing bounds on the group. In particular, the tree is not permitted to extend beyond the domain 10.

A remote network device 16 that resides outside of the domain 10 can obtain access to the multicast group via a proxy device that resides within the domain 10. In the illustrated example, the core device 14 serves as the proxy device. The proxy device 14 functions as a member of the multicast group on behalf of the remote network device 16. Data units transmitted from the remote network device 16 to the proxy device 14 are forwarded to the members of the multicast group via the proxy device. Data units transmitted from the members of the multicast group to the proxy device are forwarded to the remote network device via the proxy device. In the case of Core Based Trees ("CBT") and Protocol Independent Multicast ("PIM") multicast protocols, the logical choice for the proxy device is the core device, although other member devices could be employed. Further, the proxy device could be a nonmember device that becomes a member of the multicast group when prompted by the remote device 16.

Data units that are transmitted along a path 18 between the remote network device 16 and the proxy device are tunneled along at least a portion of the path 18. In particular, a tunnel 20 is established at least through the boundary defined by the domain 10. Each multicast data unit that is transmitted from a member of the multicast group includes a header and an information field. The header includes a multicast address that is employed to direct the data unit toward members of the group. The proxy device prepares the multicast data unit for unicast transmission to the remote device 16 by adding information such as the destination address of the remote device to the header. The added information may be included in an "envelope" that is appended to the data unit. The envelope is removed following transmission through the tunnel 20.

Data units that are transmitted from the remote device 16 to the multicast group are also tunneled along at least a portion of the path 18. In particular, the data units are transmitted via tunnel 20. The header portion of a data unit that is unicast from the remote device 16 to the proxy device specifies the destination address of the proxy device in an envelope. The proxy device prepares the unicast data unit for multicast transmission to the members of the multicast group by removing the envelope. The proxy device then multicasts the data unit toward the members of the group.

A join request data unit may be employed by the remote device 16 to initiate access to the multicast group. In particular, the remote device transmits the join request data unit to the core device 14. The address of the remote device is provided to the core device to facilitate establishment of communication. If the remote device 16 is affiliated with a remote domain, the address or name of the remote domain name may also be provided to the core device 14.

Figure 4:
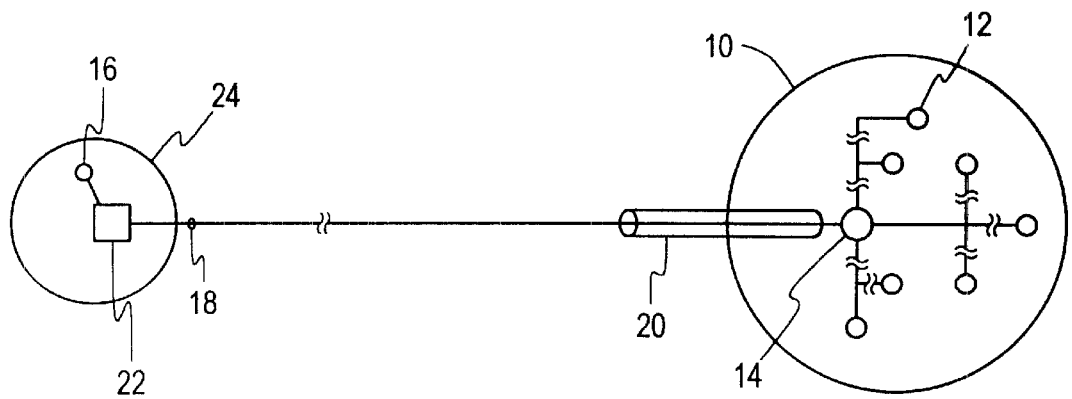
FIG. 4 is a block diagram of a portion of a computer network that illustrates a remote network device that is affiliated with a bounded multicast group via a remote router device in a manner that is consistent with the present invention.

Referring to FIG. 4, a remote router device 22 may be employed to facilitate access to the multicast group. The remote router device 22 is affiliated with a remote domain 24 in which the remote device 16 resides. The remote router device 22 functions as a gateway for devices within the domain 24 by managing traffic with proxy device 14. In particular, the remote router 22 reroutes data units that are received from the remote device 16 to the proxy device 14, and reroutes data units that are received from the proxy device 14 to the remote device 22. The data units are tunneled through at least a portion of the path between the remote router 22 and the proxy device 14.

Figure 5:
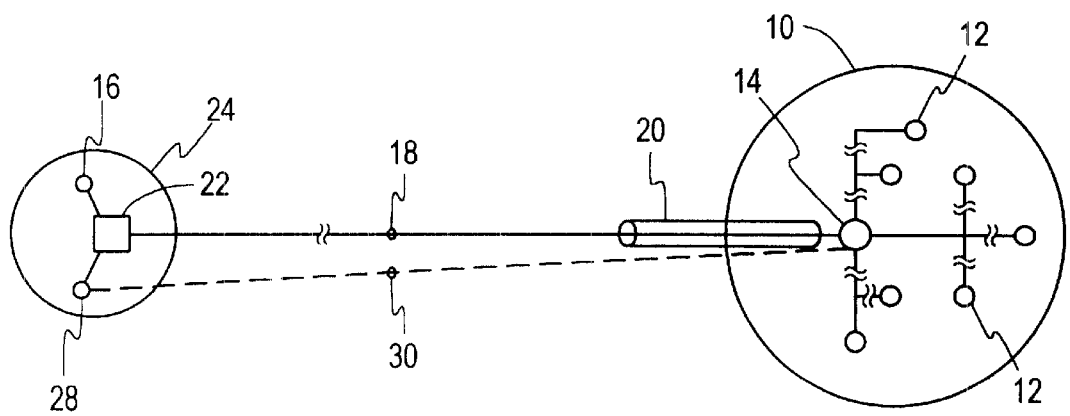
FIG. 5 is a block diagram of a portion of a computer network that illustrates a group of two remote network devices that are affiliated with a bounded multicast group via a remote router device in a manner that is consistent with the present invention.

As illustrated in FIG. 5, multiple pathways between the remote domain 24 and the multicast group can be consolidated via the remote device 22. In particular, when a second remote device 28 attempts to join the multicast group via a separate pathway 30, transmissions between the second remote device 28 and the proxy 14 are consolidated into the path 18 between the remote device 22 and the proxy 14. Remote devices may be required to indicate membership in a domain when requesting membership in the multicast group via the proxy to facilitate consolidation. The proxy device can then search for a remote member device that resides in the same domain as the requesting device and, if multiple remote devices reside in the same domain, inform the remote devices to consolidate. Alternatively, if the proxy device is employing multiple tunnels to the same remote domain, the proxy device can request that the remote devices that reside in that remote domain form a remote multicast group. A single remote device in the remote multicast group can be designated to connect the two multicast groups through a single tunnel.

It should be noted that a device other than the remote network device may send the join request data unit to the proxy device in order to establish the tunnel. An intermediate device such as the remote router 22 could be employed to determine when and how to obtain remote access to the multicast group. Further, multiple tunnels may be employed in the path between the proxy device and the remote device.

Figure 6:
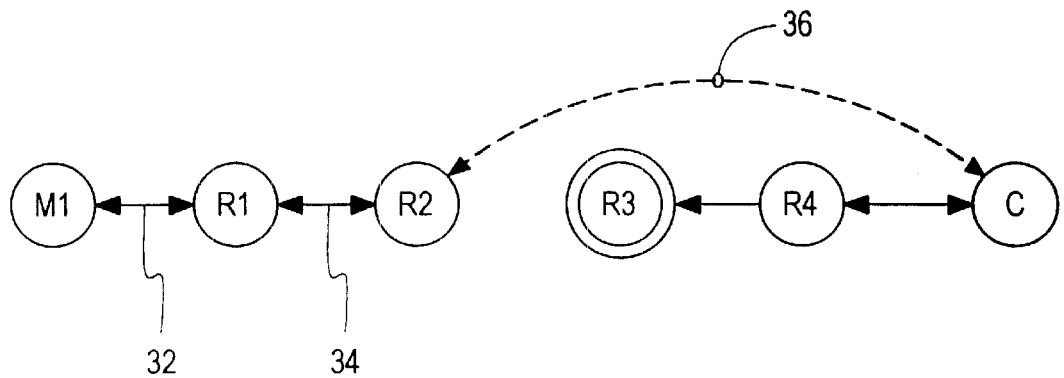
FIG. 6 is a block diagram of a portion of a multicast group that illustrates use of tunnels in a manner that is consistent with the present invention.

Referring to FIG. 6, tunnels can also be employed to provide an improved multicast tree structure by bypassing devices that do not support bidirectional trees. The multicast tree structure requires considerably less memory to store when a single, bidirectional tree is employed rather than a plurality of unidirectional trees. Tunnels are employed to bypass network devices such as routers that do not support bidirectional trees. In the illustrated example, data units are transmitted in a bidirectional pathway 32 established between member device M1 and router R1, and in a bidirectional pathway 34 established between router R1 and router R2. Data units are also transmitted in a bidirectional tunnel 36 that is established between router R2 and a core device C. The bidirectional tunnel 36 bypasses non-bidirectional router R3.

Figure 7:
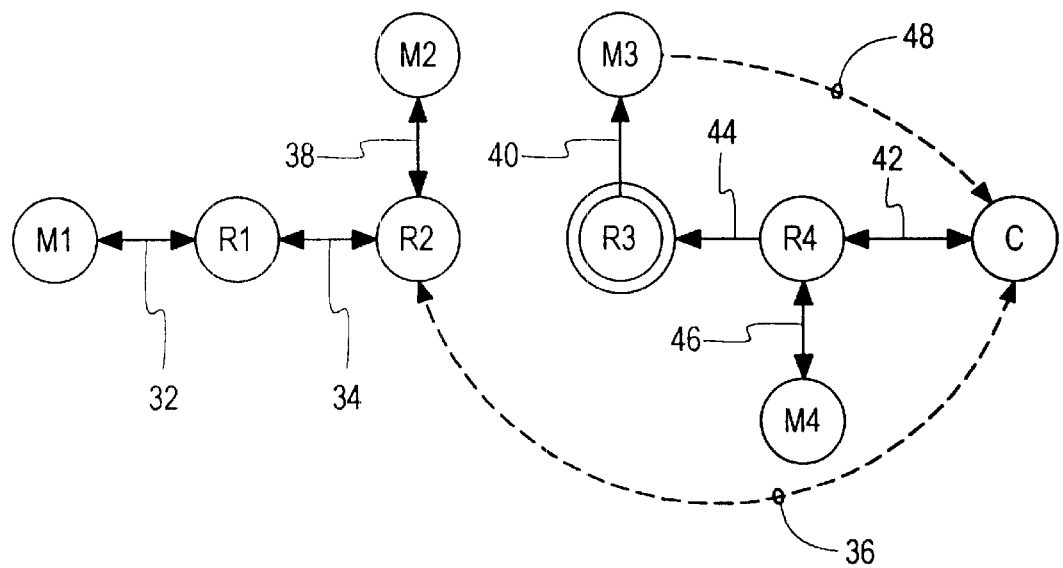
FIG. 7 illustrates operation of the multicast group of FIG. 6 when additional member devices are added.

FIG. 7 illustrates multicast communication in the network portion of FIG. 6 when a member device M2 is coupled to router R2, a member device M3 is coupled to router R3, and a member device M4 is coupled to router R4 in the multicast group. Member device M2 is coupled to router R2 via a path 38. Member device M3 is coupled to router R3 via a path 40 and to core C via tunnel 48 because router R3 does not support bidirectional paths. Member device M4 is coupled to router R4 via a path 46.

When member device M1 transmits a data unit to the other members of the multicast group, one copy of the data unit is provided to member device M2 via paths 32, 34 and 38. Another copy of the data unit is provided to the core C via path 32, path 34, and tunnel 36. From the core, the data unit is provided to member device M3 via paths 42, 44 and 40, and to member device M4 via path 42 and path 46.

When member device M2 transmits a data unit to the other members of the multicast group, one copy of the data unit is provided to member device M1 via paths 38, 34 and 32. Another copy of the data unit is provided to the core C via path 38 and tunnel 36. From the core, the data unit is provided to member device M3 via paths 42, 44 and 40, and to member device M4 via path 42 and path 46.

When member device M3 transmits a data unit to the other members of the multicast group, the data unit is tunneled to the core C via tunnel 48. From the core, the data unit is provided to member device M3 via path 42, path 44 and path 40, to member device M2 via tunnel 36 and path 38, and to member deice M1 via tunnel 36 and paths 34 and 32.

When member device M4 transmits a data unit to the other members of the multicast group, a copy of the data unit is provided to member device M3 via paths 46, 44 and 40. Another copy of the data unit is provided to the core C via paths 46 and 42. From the core, the data unit is provided to member device M2 via tunnel 36 and path 38, and to member deice M1 via tunnel 36 and paths 34 and 32.

Figure 8:
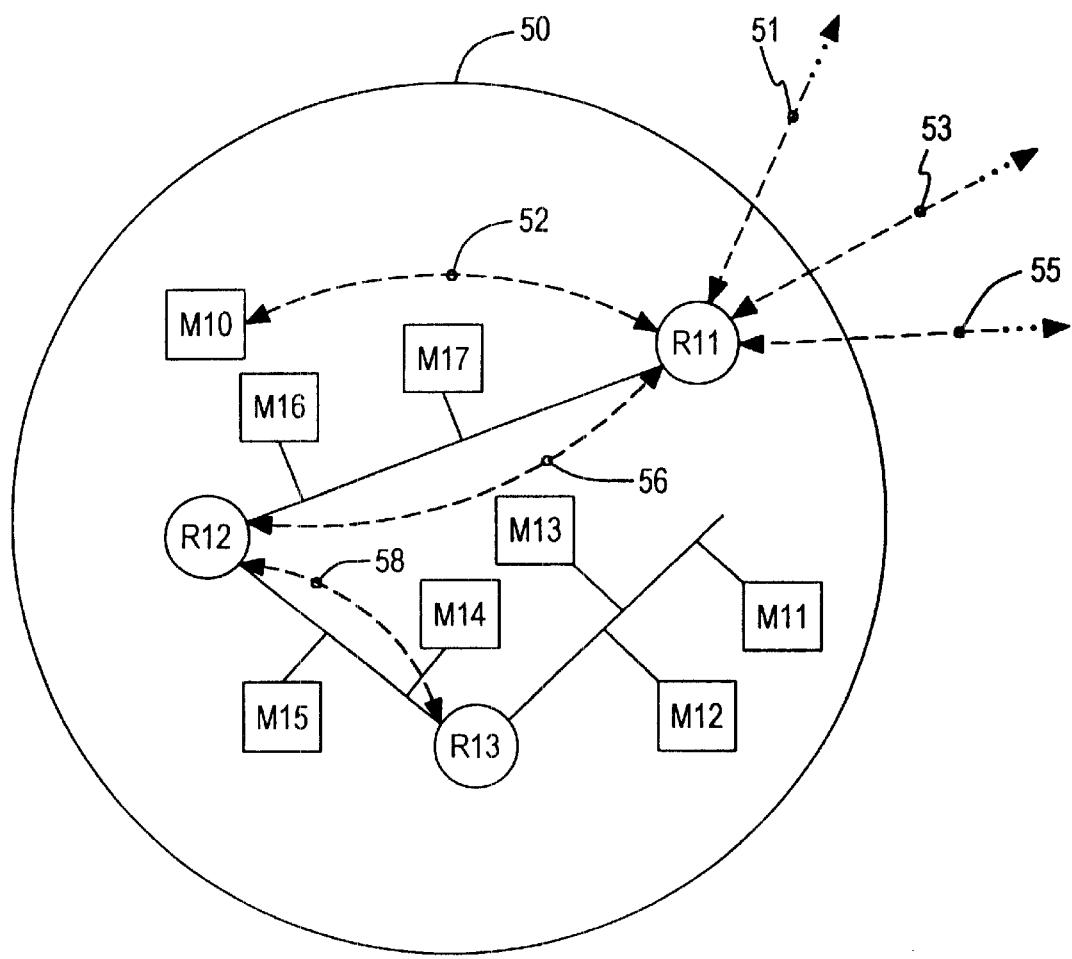
FIG. 8 is a block diagram of a portion of a multicast group that illustrates formation of new multicast group in a remote domain.

Referring to FIG. 8, a selected device such as router R11 in a remote domain 50 serves as a gateway to other devices and domains. In particular, each device within the bounds of remote domain 50 employs device R11 to obtain access to devices that are outside of remote domain 50 when such access is desired. In the illustrated example, a tunnel 52 is established between device R11 and member device M10. A plurality of tunnels 51, 53, 55 may be established between device R11 and devices outside of the remote domain 50.

To facilitate operation when a plurality of devices within remote domain 50 are employing one of the interfacing tunnels, such as tunnel 51, a new multicast group is formed within the remote domain. In the illustrated example, formation of the new multicast group is initiated by device R11. Tunnels augment performance of the new multicast group. For example, when member device M13 and member device M12 both become members of the group that is affiliated with tunnel 51, a tunnel 56 is established between device R11 and device R12 and a second tunnel 58 is established between device R12 and device R13 to carry the data units. Device R13 multicasts the data units from tunnel 58 to member devices M12 and M13, and transmits data units from member devices M12 and M13 via the tunnel 58. The tunnels augment performance by obviating the need for separate tunnels between each member device and device R11.

Having described the embodiments consistent with the present invention, other embodiments and variations consistent with the present invention will be apparent to those skilled in the art. Therefore, the invention should not be viewed as limited to the disclosed embodiments but rather should be viewed as limited only by the spirit and scope of the appended claims.

What is claimed is:

1. A method for providing communication between member devices that are associated with a multicast group that resides in a predetermined domain and a remote network device that resides outside of said domain, comprising the Steps of:

transmitting a multicast data unit from a first member device to a second member device, the multicast data unit having a header portion including a multicast destination address;

adding a unicast address to the multicast data unit, by appending information to the multicast data unit, the information, including a destination unicast address; and transmitting the multicast data unit from the second member device to the remote network device.

2. The method of claim 1 wherein the remote network device is associated with a remote domain, and further including the step of consolidating transmissions between the multicast group and the remote domain by transmitting the multicast data unit from the remote network device to at least one other device in the remote domain.

3. the method of claim 2 further including the step of monitoring transmissions to remote domains with the second member device to determine whether consolidation is possible.

4. The method of claim 3 further including the step of the remote network device revealing the remote domain that is associated with the remote network device upon joining the multicast group.

5. The method of claim 1 wherein the remote network device is a remote router device that is associated with a remote domain, and further including the step of consolidating transmissions between the multicast group and the remote domain by multicasting the data unit from the remote router device to at least one end node device in the remote domain.

6. The method of claim 5 further including the step of transmitting a second data unit from one of the end node devices to the second member device via the remote router device.

7. A proxy device that enables communication between member devices that are associated with a rnulticast group thatresides in a predetermined domain and a remote network device that resides outside of said domain, comprising:

at least one input port that receives a multicast data unit from a first device that is a member of the multicast group, the multicast data unit having a header portion including a multicast destination address;

a routine that writes a unicast address to the data unit, by appending information to the data unit, the information including the unicast address as a destination address; and at least one output port that transmits the data unit through the domain and toward the remote network device.

8. The device of claim 7 wherein the remote network device is associated with a remote domain, and wherein transmissions between the multicast group and the remote domain are consolidated by multicasting the data unit from the remote network device to at least one other device in the remote domain.

9. The device of claim 8 wherein said proxy device monitors transmissions to remote domains and determines whether consolidation is possible.

10. The device of claim 9 wherein each remote network device reveals the remote domain that is associated with that remote network device to said proxy device upon joining the multicast group.

11. The device of claim 7 wherein the remote network device is a remote router device that is associated with a remote domain, and wherein transmissions between the multicast group and the remote domain are consolidated by multicasting the data unit from the remote router device to at least one end node device in the remote domain.

12. The device of claim 11 wherein a second data unit is transmitted from one of the end node devices to the second member device via the remote router device.

13. A method for communicating between member devices of a multicast group and a distant node, comprising the steps of:
   designating a proxy device to function as a member of said multicast group;
   establishing a bidirectional tunnel between said proxy device and said distant node;
   transmitting data units from at least one member device to said proxy device, the data units each having a header portion including a multicast destination address; and
   transmitting said data units, to said distant node via said bidirectional tunnel, including appending information including a unicast destination address to each of the data units.

14. The method of claim 13 wherein the distant node is associated with a distant domain, and further including the step of consolidating transmissions between the proxy device and the distant domain by multicasting the data unit from the distant node to at least one other device in the distant domain.

15. The method of claim 14 further including the step of monitoring transmissions to distant domains with the proxy device to determine whether consolidation is possible.

16. The method of claim 15 further including the step of the distant node identifying the distant domain to the proxy device upon joining the multicast group.

17. The method of claim 13 wherein the distant node is a remote router that is associated with a distant domain, and further including the step of consolidating transmissions between the multicast group and the distant domain by multicasting the data unit from the remote router to at least one end node device in the distant domain.

18. The method of claim 17 further including the step of transmitting a second data unit from one of the distant end nodes to the proxy device via the remote router.

19. Apparatus for facilitating communication between member devices of a multicast group and a distant node, comprising:
   a proxy device that functions as a member of said multicast group, said proxy device being operative to establish a bidirectional tunnel between said proxy device and said distant node and transmit data units received from member devices via said bidirectional tunnel, the data units each having a header portion including a multicast destination address, wherein the proxy device operates to transmit the data units by appending information to each of the data units, the information including a unicast address to each of the data units.

20. The apparatus of claim 19 wherein the distant node is associated with a distant domain, and wherein the proxy consolidates transmissions between the proxy device and the distant domain by prompting the distant node to muulticast the data units from the distant node to at least one other device in the distant domain.

21. The apparatus of claim 19 wherein said proxy device monitors transmissions to distant domains to determine whether consolidation is possible.

22. The apparatus of claim 21 wherein the distant node identifies the distant domain to the proxy device upon joining the multicast group.

23. The apparatus of claim 19 wherein the distant node is a remote router that is associated with a distant domain, and wherein transmissions between the multicast group and the distant domain are consolidated by multicasting the data units from the remote router to at least one end node device in the distant domain.

24. The apparatus of claim 23 further including the step of transmitting a second data unit from one of the distant end nodes to the proxy device via the remote router.

25. A method for facilitating communication within a group of network devices that includes at least one device of a first type that supports bidirectional trees and at least one device of a second type that does not support bidirectional trees, comprising the steps of:
   establishing a bidirectional pathway between each adjacently coupled pair of devices of the first type; and
   establishing a bidirectional tunnel through each device of the second type, between a predetermined pair of devices of the first type, wherein data units conveyed over the bidirectional tunnel include a header portion having a multicast destination address and additional appended information including a unicast destination address.

26. The method of claim 25 further including the step of establishing a unidirectional link between at least one of the devices of the second type and an adjacently coupled device of the first type.

27. The method of claim 26 wherein the group includes a core device, and further including the step of establishing a unidirectional tunnel between the core and the at least one of the devices that is adjacently coupled with the device of the second type.

28. Apparatus for facilitating communication within a group of network devices, comprising:
   at least one device of a first type that supports bidirectional trees; and
   at least one device of a second type that does not support bidirectional trees,
   wherein a bidirectional pathway is established between each adjacently coupled pair of devices of the first type, and a bidirectional tunnel is established through each device of the second type, between a predetermined, pair of devices of the first type, wherein data units conveyed over the bidirectional tunnel include a header portion having a multicast destination address and additional appended information including a unicast destination address.

29. the apparatus of claim 28 wherein a unidirectional link is established between at least one of the devices of the second type and an adjacently coupled device of the first type.

30. The apparatus of claim 29 wherein the group includes a core device and a unidirectional tunnel is established between the core and the at least one of the devices of the first type that is adjacently coupled with the device of the second type.

31. The apparatus of claim 28 wherein said bidirectional tunnel is established between the nearest pair of devices of the first type.

32. The apparatus of claim 28 wherein one of said pair of devices is a core device.

33. The apparatus of claim 28 wherein one of said pair of devices is coupled between a core device and a device nearest to the device of the second type.

34. Apparatus for communicating between member devices that are associated with a multicast group that resides in a predetermined domain and a remote network device that resides outside of said domain, comprising:

means for transmitting a multicast data unit to one of said member devices, the multicast data unit having a header portion including a multicast destination address;

means for adding a unicast address to said data unit; and means for transmitting said data unit having said unicast address to the remote network device, by appending information to the multicast data unit, the information including a destination unicast address.

\* \* \* \* \*